United States Patent
Laak

[19]

[11] Patent Number: 5,951,203
[45] Date of Patent: Sep. 14, 1999

[54] LEACHING FIELD CONSTRUCTION

[76] Inventor: Rein Laak, 149 Browns Rd., Storrs, Conn. 06268

[21] Appl. No.: 08/859,802

[22] Filed: May 19, 1997

[51] Int. Cl.$^6$ .................................................. E02B 11/00
[52] U.S. Cl. ................................ 405/45; 405/36; 405/43
[58] Field of Search ................................ 405/43, 45, 119, 405/157; 52/169.5, 169.14

[56] References Cited

U.S. PATENT DOCUMENTS

| | | | |
|---|---|---|---|
| 585,856 | 7/1897 | Swanson | 405/45 X |
| 3,611,729 | 10/1971 | Stark | 405/43 X |
| 4,622,138 | 11/1986 | Wager | 405/45 |
| 4,756,643 | 7/1988 | Hurley | 405/45 X |
| 4,917,536 | 4/1990 | Glasser | 405/45 |
| 4,925,342 | 5/1990 | Hendy | 405/45 |
| 4,943,185 | 7/1990 | McGuckin et al. | 405/45 |
| 5,085,539 | 2/1992 | Massarsch | 405/157 X |
| 5,406,758 | 4/1995 | Baum | 405/43 X |
| 5,597,264 | 1/1997 | Laak | 405/36 |

FOREIGN PATENT DOCUMENTS 0036825  2/1989  Japan ........................................ 405/45

*Primary Examiner*—Dennis L. Taylor
*Attorney, Agent, or Firm*—McCormick, Paulding & Huber LLP

[57] ABSTRACT

A leaching field is constructed from a plurality of rectangularly shaped elongated geotextile covered in-drain core elements provided alongside one another. The elements have equally spaced fold lines extending laterally across their adjacent semi-folded portions so that a stack of such elements in a flattened condition occupies a minimal space whereby these elements can be readily transported to the site. When expanded honey comb configuration is achieved so that a self supporting in-drain structure greatly facilitate construction of the leaching field without the need for templates and the like to support the structure during the filling of the voids between the adjacent in-drain elements themselves. If desired, expendable stakes may be used to support the in-drain assemblies in an optimum configuration.

5 Claims, 3 Drawing Sheets

LEACHING FIELD CONSTRUCTION

BACKGROUND OF THE INVENTION

This invention relates generally to the construction of leaching fields of the type associated with present day septic systems that require draining of effluent from the septic tank into the surrounding soil. One example of a prior art leaching field of this general type is illustrated in U.S. Pat. No. 5,597,264. The leaching field itself as disclosed in '264 Patent is known, and that Patent relates to a particular method for holding the components of the leaching field in an erect condition while the sand or other water absorbing fill material is provided around these components.

SUMMARY OF THE INVENTION

In accordance with the present invention, a leaching field is constructed providing a distribution manifold downstream of a conventional septic tank for receiving the effluent from the tank, and directing this effluent through longitudinally spaced outlets provided along the manifold for flow into a unique configuration of in-drains. The in-drains are prepared from geotextile fabric wrapped plastic cores or fins. These wrapped geotextile fabric envelopes are preferably provided in the shape of rectangularly elongated elements, and each of these elements is provided with a fold line so that the rectangularly shaped elongated element can be unfolded into zig-zag shapes or configurations so as to define an acute angle at each of the fold lines. Another element also of elongated rectangular shape is provided adjacent the first and has the same general configuration, that is having corresponding, but opposite folded fold lines. Connectors are provided to join the adjacent apexes of these adjacent elements to yield a generally diamond shape configuration that serve to support one element relative to the other and to avoid the necessity for a template such as that suggested in the above-mentioned prior U.S. Pat. No. 5,597,264.

Additional rectangular elongated envelope in-drain elements are provided alongside the above-described adjacent elements to yield a honeycomb construction for the geotextile fabric wrapped plastic cores or fins (in-drains).

Alternatively, one long in-drain element can be folded back on itself to provide the same honeycomb shape for these geotextile fabric wrapped plastic cones or fins.

Such a configuration requires only a shallow trench or excavation, the depth of which is on the same order of magnitude as the normal spacing between generally rectangular envelopes of the type shown in U.S. Pat. No. 5,597,264. These rectangular in-drain elements are tied together at intervals of approximately the same order of magnitude as the depth of the elements themselves. This depth is preferably in the order of seven inches in height so as to require an excavation on the order of less than one foot in depth. Although the elements themselves are flexible and may be several feet in length, the present invention provides for joining the elements together as mentioned previously and allows folding of these joined elements into a flat convenient size and shape configuration for shipment to a job site.

At the job site, the flattened elements are opened up accordion fashion so as to form the generally honeycomb shape that allows construction of the leaching field without the need for a template or other means to support the elements in an upright configuration during the refilling of the leaching field voids with sand or other porous filled materials.

Finally, and in accordance with the teaching of the U.S. Pat. No. 5,597,264 Patent, it is also possible to provide one or more stand pipes at downstream ends of these honeycomb leaching field configurations. Such stand-pipes are preferably capped, but may be periodically uncapped in order to permit back flushing of the honeycomb shaped envelope configuration. This feature can lead to increased life for a leaching field constructed in accordance with the present invention.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings, wherein.

DETAILED DESCRIPTION OF THE EMBODIMENT OF FIGS. 1–4

Figure 4:
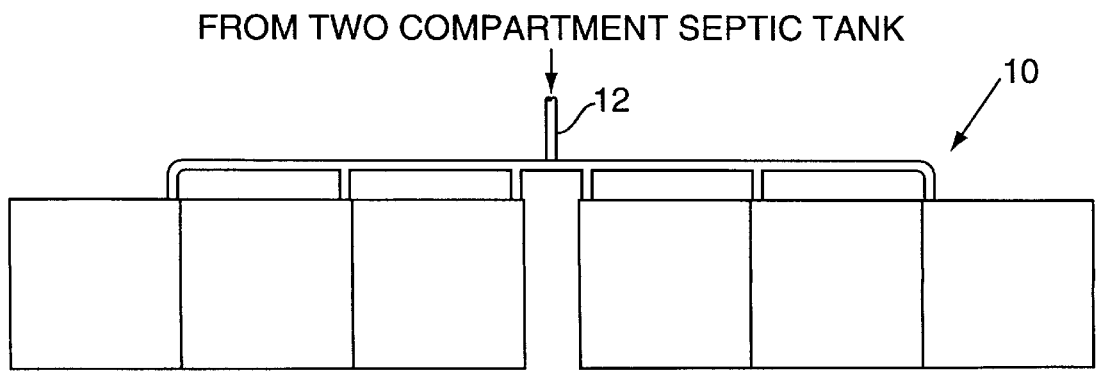
FIG. 4 is an overall plan view of a segmented septic system assembly which may be used to feed a common manifold for providing effluent to a leaching field of the type which is shown in FIGS. 1–3.

Turning now to the drawings in greater detail, the present invention relates to an improved leaching field for an otherwise conventional septic system of the type shown in FIG. 4 for example. In such a system, domestic waste water is disposed and dispersed in the soil. A septic tank serves as a holding tank for settling out solids in the effluent so that the liquid can be dispersed into the soil. Particular reference is made to FIG. 4 in which a discharge pipe 12 is associated with a septic system 10. The pipe 12 in FIG. 4 extends downstream from the septic tank to provide effluent to the leaching field to be described.

Figure 1:
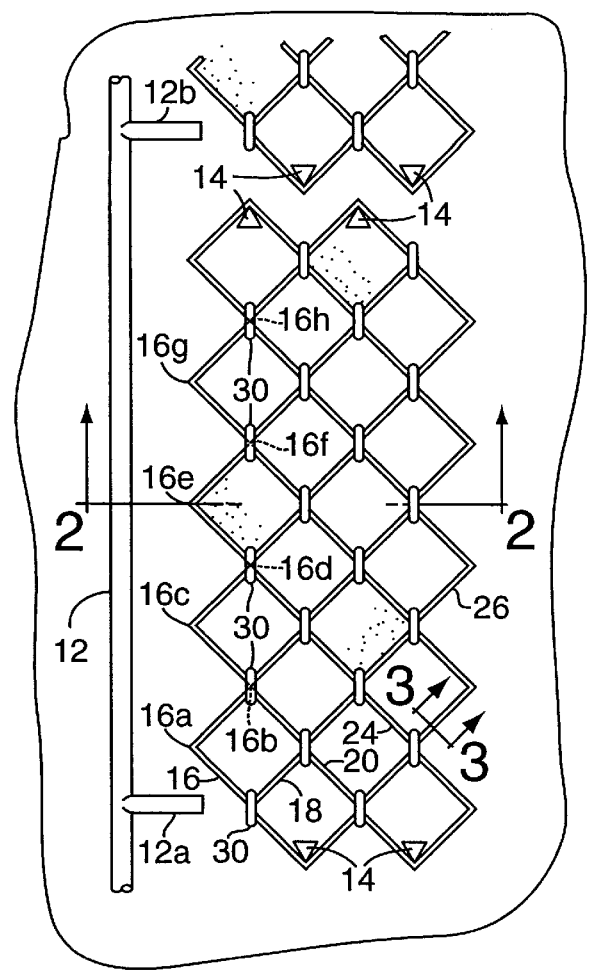
FIG. 1 shows in an overall plan view of a portion of a leaching field provided in association with a manifold of the type adapted to receive effluent from a septic tank (not shown).
Figure 2:
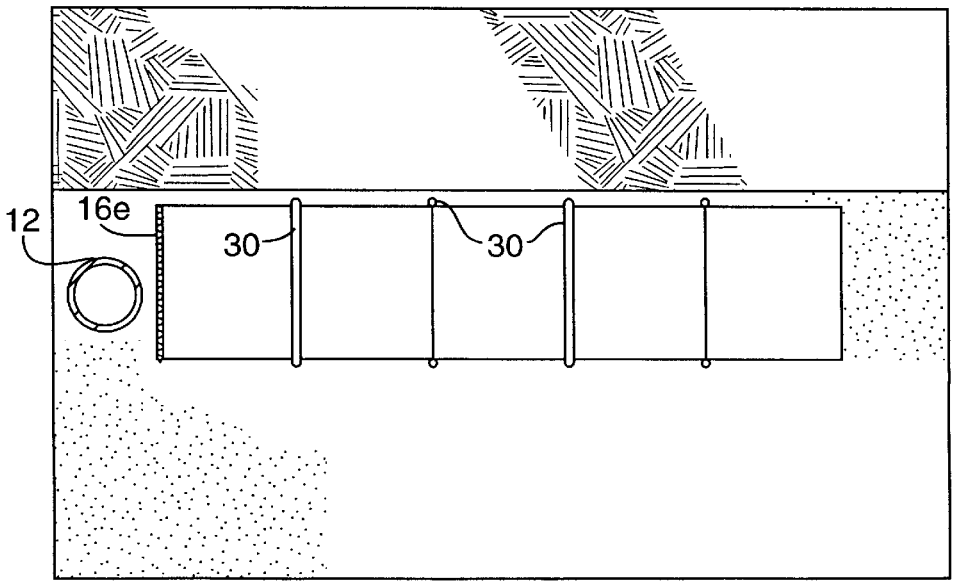
FIG. 2 is a sectional view taken generally on the line 2,2 of FIG. 1.

Turning now to a more detailed consideration of FIG. 1, the leaching field is prepared by excavating the soil in a predetermined area to a depth of approximately 10–12 inches. After placement of the effluent manifold pipe 12, a series of stakes 14,14 are driven into the ground in a predetermined pattern so as to support the elongated generally rectangular elements to be described. In the presently preferred embodiment of the invention, a plurality of elongated generally rectangular elements 16, 18, 20, 24 and 26 are provided with a plurality of equally spaced folds 16a, 16c, 16e and 16g which folds are equally spaced from one another and form oppositely directed folds 16b, 16d, 16f and 16h. These oppositely directed folds of the adjacent element 18 are joined by connectors 30, 30 that may be in the form of plastic ties which anchor the adjacent fold lines of these adjacent elements 16 and 18 to provide a high degree of stability for the resulting structure in order to facilitate filling of the voids defined between these elements and filling the surrounding space which has been evacuated as described previously.

Figure 3:
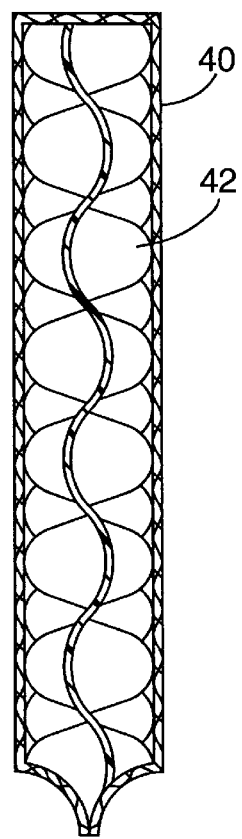
FIG. 3 is a sectional view taken generally on the line 3,3 of FIG. 1.

Turning next to FIG. 3, which is a sectional view of the elongated element taken on the line 3,3 of FIG. 1, it will be apparent that the external envelope comprises a geotextile nonwoven fabric as indicated generally at 40, and that an internal core is provided, preferably of polystyrene. The rigid core sheet 42 is surrounded by this geotextile fabric and the fabric takes its shape from the oppositely directed, opposing hills and valleys provided on opposite sides of the core sheet 42. Thus, the geotextile envelope and associated core sheet are quite similar to the structure described previously with reference to U.S. Pat. No. 5,597,264. However, the core sheet 42 is provided of a material that can be folded, at intervals and as indicated previously, to provide the diamond shaped pattern when several adjacent rectangular elements are provided alongside one another to form the honey comb structure best shown in FIG. 1.

Still with reference to FIG. 1, the generally honey comb shaped leaching field structure includes a plurality of elements of the type just described, each of which includes a plurality of prefolded rectangular elements 16, 18, 20, 24 and 26. The adjacent elements being joined together by ties as suggested at 30, 30 to provide the generally upwardly open honey comb structure that can be readily filled with sand or other porous fill material in order to provide a leaching field of appropriate capacity to meet the requirements of a particular installation. The manifold effluent pipe 12 is provided with spaced outlet ports 12a and 12b associated with the honey comb shaped upright leaching field subassemblies one of which is illustrated in FIG. 1.

Obviously, many modifications and variations of the present invention will become apparent in light of the above teachings. For example, the geotextile fabric presently preferred together with the core material around which it is wrapped can take any number of geometric shapes as long as the basic structure permits folding of these elements at spaced locations to provide openings between adjacent elements of similar construction so as to allow these elements to be tied together and thereby form voids into which sand or other absorbent fill material can be provided to result in a leaching field of appropriate characteristics. A variety of in-drain configurations are described in the prior art generally and will not be redescribed here. For present purposes, it is sufficient to note that the preferred form of in-drain comprises a non woven geotextile fabric wrapped around a plastic, dimpled core sheet, and that such an in-drain element requires holes or openings in the core. This core and the envelope are relatively inexpensive to manufacture and to transport. Use of the template as taught in my prior U.S. Pat. No. 5,597,264 is no longer required as a result of the unique geometry for the in-drain configuration described above. Once the in-drains have been fabricated in accordance with the present invention, they can be collapsed for storage and ease in transportation to a construction site. At the construction site, one needs simply drive stakes into the bottom of the shallow excavation so as to afford a very inexpensive and easily erected support for these in-drain assemblies or subassemblies. The use of such stakes is considerably simpler than the former requirement for a template as taught in U.S. Pat. No. 5,597,264. It is also significant that the resulting in-drain structure provides for the formation of a leaching field which when covered with fill of a conventional variety will permit even heavy equipment to move over the earth without fear of collapsing the in-drain structure itself.

DETAILED DESCRIPTION OF THE FIG. 5 EMBODIMENT

Figure 5:
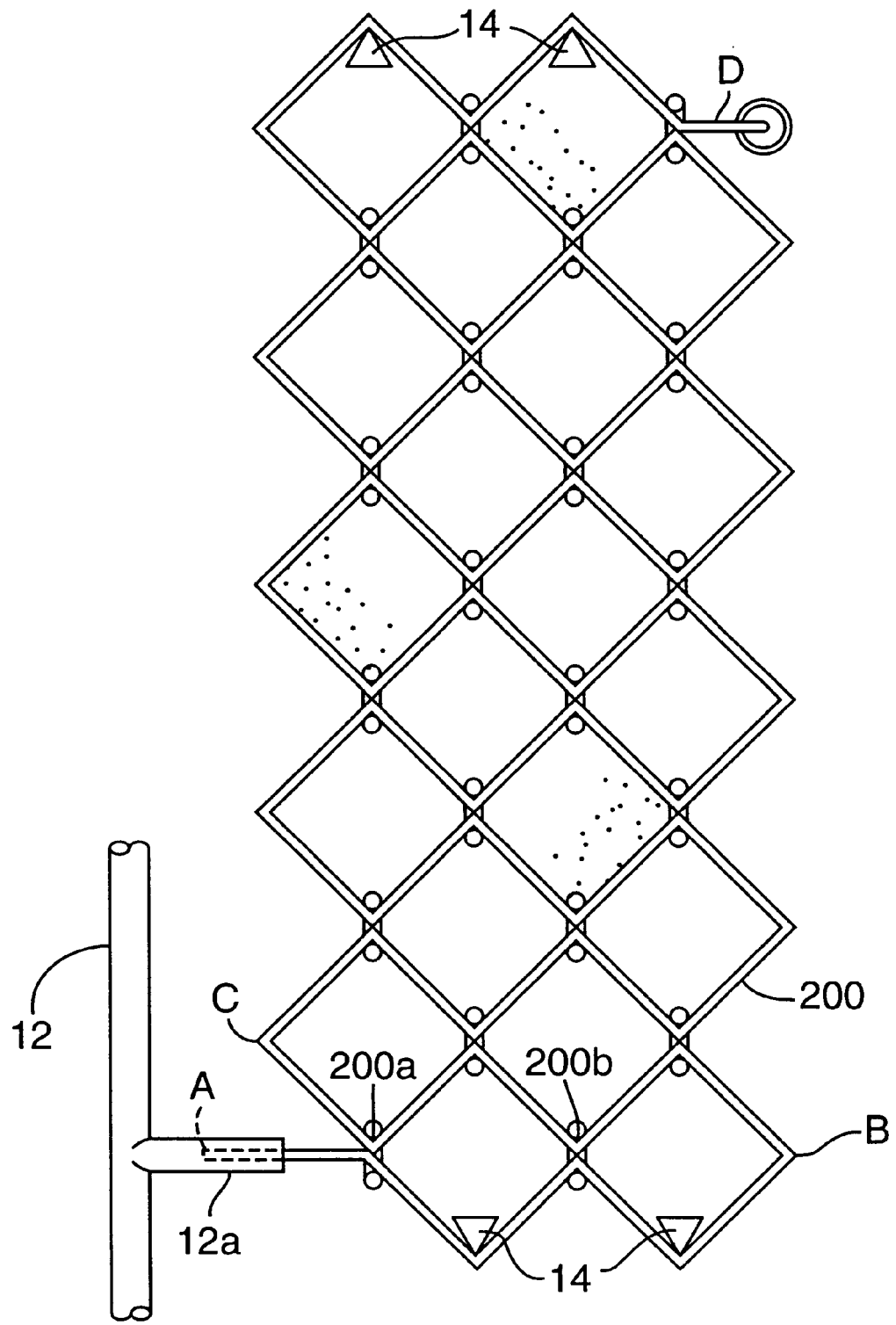
FIG. 5 shows in plan view, a portion of a leaching field of alternative configuration.

The leaching field of FIG. 5 is similar to that of FIGS. 1–4, except for the specific structure of the assembled elements. Whereas, several partially folded elements 16, 18, 20, 24 and 26 make up the honeycomb shaped leaching field of FIG. 1, the FIG. 5 version comprises one or more longer elements that is folded back on itself to provide the same resulting honeycomb shape.

The same manifold 12 provides the effluent through outlets such as shown at 12a, and one end A of the zig-zag folded element 200 may be provided inside the outlet as shown at A in FIG. 5.

The element 200 has 45° fold points where it is held in place by the stakes 14, 14, but a 90° bend where it is folded back on itself as shown at B. At the apex or 45° fold points 200a and 200b, ties or plastic clips connect these 45° fold points as described above with reference to FIG. 1 at 16b, 16d.

The elongated element 200 is again folded back on itself as shown at C in FIG. 5 and the same general geometry is repeated until the element 200 terminates at D. Additional stakes 14, 14 support the element in the stretched configuration shown, all as described previously with reference to the FIG. 1 version. A standpipe such as that shown in my U.S. Pat. No. 5,597,264 may be provided for the same purpose as therein described, at the "downstream" end of the element as suggested at D in FIG. 5. Ideally, the effluent will follow along the entire length of the elongated zig-zag shaped element from A to D as a result of the element's envelope shape (as shown in FIG. 3 for the FIG. 4 version).

I claim:

1. In a septic system wherein, effluent from a septic tank or distribution box must be drained into the surrounding soil by a leaching field or equivalent, the improvement comprising:

a horizontally oriented manifold pipe for receiving the effluent from the septic tank or distribution box, said manifold pipe having outlets spaced along its length, a plurality of in-drain assemblies provided adjacent to said manifold pipe outlets, each in-drain assembly including at least one elongated rectangular geotextile fabric envelope and plastic cores in each envelope, each core and envelope defining passageways on both sides of said core, said passageways being covered by the geotextile fabric envelope, each such geotextile fabric envelope element being provided with longitudinally spaced fold lines extending laterally across its elongated rectangular configuration, whereby each of said subassemblies are normally flattened for shipment, and are expandable accordion-style to be staked in a zig-zag pattern that includes voids between adjacent portions of the envelope at a leaching field site.

2. The improvement according to claim 1, further characterized by supports in at least some of said voids to maintain the adjacent geotextile covered plastic cores in an upright configuration prior to filling of these voids with a soil or other porous fill material.

3. The improvement according to claim 2, further characterized by ties for coupling said adjacent geotextile fabric covered core elements to one another, at adjacent fold lines in order to yield a honey comb configuration for the in-drain subassembly.

4. The improvement according to claim 1, wherein a stand pipe is provided for back flushing the in-drains subassemblies, said stand pipe being provided adjacent a down stream end of the in-drain assemblies or subassemblies generally opposite the manifold effluent pipe.

5. The improvement of claim 1, wherein each in-drain subassembly comprises a single elongated rectangular geotextile fabric envelope and cores, certain of said fold lines being 45° folds, and others being 90° or more for achieving said zig-zag pattern and providing a honeycomb configuration.

* * * * *